(12) United States Patent
Moe et al.

(10) Patent No.: US 9,084,134 B2
(45) Date of Patent: Jul. 14, 2015

(54) METHOD AND ARRANGEMENT FOR PROBING OF ALTERNATIVE ANTENNA CONFIGURATIONS IN A COMMUNICATION NETWORK SYSTEM

(75) Inventors: Johan Moe, Mantorp (SE); Mehdi Amirijoo, Linköping (SE); Pål Frenger, Linköping (SE); Fredrik Gunnarsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 122 days.

(21) Appl. No.: 13/885,462

(22) PCT Filed: Nov. 16, 2010

(86) PCT No.: PCT/SE2010/051261
§ 371 (c)(1),
(2), (4) Date: May 15, 2013

(87) PCT Pub. No.: WO2012/067554
PCT Pub. Date: May 24, 2012

(65) Prior Publication Data
US 2013/0237158 A1    Sep. 12, 2013

(51) Int. Cl.
*H04B 17/00* (2006.01)
*H04W 24/02* (2009.01)
(Continued)

(52) U.S. Cl.
CPC .............. *H04W 24/02* (2013.01); *H04B 17/12* (2015.01); *H04B 7/0602* (2013.01); *H04W 24/10* (2013.01); *H04W 28/18* (2013.01); *H04W 40/06* (2013.01); *H04W 88/02* (2013.01)

(58) Field of Classification Search
CPC .............................. H04W 40/06; H04W 24/02
USPC ............ 455/67.11, 423, 67.13, 115.1, 226.1, 455/422.1, 575.7, 193.1; 370/241, 328, 329
See application file for complete search history.

(56) References Cited

U.S. PATENT DOCUMENTS 7,167,681 B2 *   1/2007   Kuurne et al. ............. 455/67.11
7,359,679 B2 *   4/2008   King et al. .................... 455/101
(Continued)

FOREIGN PATENT DOCUMENTS

EP    1 611 758         1/2006
EP    2 161 851 A1      3/2010
(Continued)

OTHER PUBLICATIONS
International Search Report for PCT/SE2010/051261, mailed Aug. 17, 2011.
(Continued)

*Primary Examiner* — Sonny Trinh (57) ABSTRACT

The present invention relates to an arrangement, a communication network node and a user equipment allowing for probing of alternative antenna configurations in a communication network system as well as a method for such probing. The method comprises making one of the reconfigurable antennas (15a2, 15b2) of at least one cell (19a, 19b) temporarily available for probing and reconfiguring one or more antenna parameters thereof in accordance with a probing antenna parameter set. A new probe cell (20a, 20b) is transmitted from the prepared antenna (15a2, 15b2) and measurement reports collected from the user equipments (18) within the at least one cell (19a, 19b) and the probe cell (20a, 20b). The probing antenna parameter set is evaluated based on the collected measurement reports whereupon is determined if the reconfigurable physical antennas (15a1, 15a2, 15b1, 15b2) of the cell shall use the probing antenna parameter set or the initial antenna parameter set. Finally the probing cell (20a, 20b) is removed and the antennas (15a1, 15a2, 15b1, 15b2) adjusted in accordance with the determination.

21 Claims, 8 Drawing Sheets

(51) Int. Cl.
*H04B 17/12* (2015.01)
*H04B 7/06* (2006.01)
*H04W 24/10* (2009.01)
*H04W 28/18* (2009.01)
*H04W 40/06* (2009.01)
*H04W 88/02* (2009.01)

(56) References Cited

U.S. PATENT DOCUMENTS

| | | | |
|---|---|---|---|
| 7,499,691 | B1 | 3/2009 | Dunn et al. |
| 8,792,414 | B2 * | 7/2014 | Kish ............... 370/328 |
| 8,792,444 | B2 * | 7/2014 | Ishida et al. ........... 370/329 |
| 2006/0040707 | A1 | 2/2006 | Kish et al. |
| 2007/0026807 | A1 | 2/2007 | Kish |
| 2009/0117858 | A1 | 5/2009 | Furrer et al. |
| 2010/0034314 | A1 | 2/2010 | Brown et al. |

FOREIGN PATENT DOCUMENTS

| | | |
|---|---|---|
| WO | WO 2004/114460 A2 | 12/2004 |
| WO | WO 2011/037501 | 3/2011 |

OTHER PUBLICATIONS

Written Opinion for PCT/SE2010/051261, mailed Aug. 17, 2011.
Tino, et al. BS Probing Approach for Energy Saving Wake up in Hotspot Deployments. 3GPP Draft; R3-103299, $3^{rd}$ Generation Partnership Program; Mobile Competence Centre. Nov. 8, 2010.
Ambrosy et al. Self-configuration and self-optimization of 4G Radio Access Networks (IEEE C802.16m-07/169) 11, IEEE C802.16M-07/169, Aug. 29, 2007.
Nortel Networks. Consideration on Coverage-Capacity Self-Optimization 3GPP Draft; R3-061749 Consideration on Coverage-Capacity Self-Optimization LTE Disc, 3rd Generation Partnership Project (3GPP), Mobile Competence Centre ; 650, Route Des Lucioles ; F-06921 Sophia-Antipolis Cedex; France, vol. RAN WG3, No. Riga, Latvia; Nov. 6, 2006-Nov. 10, 2006, Nov. 1, 2006.
3rd Generation Partnership Project; Technical Specification Group Radio Access Network; Study on Minimization of Drive-tests in Next Generation Networks; (Release 9). 3GPP Standard; 3GPP TR 36.805, $3^{rd}$ Generation Partnership Project (3GPP), Mobile Competence Centre ; 650, Route Des Lucioles ; F-06921 Sophia-Antipolis Cedex ; France, No. V9.0.0, Dec. 21, 2009.

* cited by examiner

METHOD AND ARRANGEMENT FOR PROBING OF ALTERNATIVE ANTENNA CONFIGURATIONS IN A COMMUNICATION NETWORK SYSTEM

This application is the U.S. national phase of International Application No. PCT/SE2010/051261 filed 16 Nov. 2010 which designated the U.S., the entire content of which is hereby incorporated by reference.

TECHNICAL FIELD

The present invention relates to a method, an arrangement and a communication network node in a communication network system as well as a user equipment and, more particular to arrangements, communication network nodes and user equipments allowing for probing of alternative antenna configurations in a communication network system as well as a method for such probing of alternative antenna configurations in a communication network system.

BACKGROUND

One important focus area in E-UTRAN standardization work is to ensure that a new network is simple to deploy and cost efficient to operate. The vision is that new systems shall be self-organizing in as many aspects as possible.

Coverage and capacity (C&C) handling is attracting much interest in 3GPP Release 10, since it is seen as an OPEX driver. C&C is also a classical radio subject and can be said to cover a large area of problem definitions, solution activities, and tools.

In principle C&C is the problem of giving users coverage "inside" (e.g. a building), "behind" (e.g. a hill) and "far away", while guaranteeing enough capacity so that the service level can be fulfilled.

As is evident in LTE and legacy systems as WCDMA and GSM, a radio network can be quite competent in configuring itself. The main reason is its possibility to measure via UEs. The network can for example change one parameter, say handover margin, and order UEs (and base stations) to measure the impact. Measurements like Reference Signal Received Power (RSRP), Reference Signal Received Quality (RSRQ) from UEs tell the system how the change had effect on UE and network performance.

Mobile telecommunication networks are gradually evolved; the network must handle increasing demands, with more nodes, more carriers and more users. The network must continuously be tuned to offer an acceptable quality. Traditionally this has been done via drive tests, to collect good enough information and planning tools to generate new settings for existing and new sites.

Today planning tools are the main method to generate a network plan and parameter settings. However a planning tool may suffer from inaccurate models which may imply non optimal planning proposals. Therefore one is bound to collect information from a real network. This may be done with dedicated UEs (drive tests) or normal UEs.

The benefit with drive tests is that they can be more accurate and directed to a specific geographical location (say a site's coverage area) while relying on normal UEs may suffer from a few samples and therefore takes time to generate the same accuracy. The benefit with normal UEs measuring is cost; it requires no personnel, no cars etc.

However, the biggest problem is that to be able to measure one must launch the plan, a plan that may have negative impact on users' quality experience. For example if relying on normal UEs in situations where a network reconfiguration would lead to UE loss, i.e. the UE will not have any coverage—the UE would be suffering from the coverage hole and even worse it would not be able to report loss of coverage back to the network.

Some solutions have been proposed to handle the above mentioned problem—3GPP now discusses possibilities for UEs to save logs and report back once they have coverage again, e.g. 3GPP TR 36.805 "Study on Minimization of drive-tests in Next Generation Networks".

SUMMARY

Accordingly, one objective with the present invention is to provide an improved method for probing of alternative antenna configurations in a communication network system comprising a plurality of communication network nodes communicating with one or more user equipments, where each network node is serving at least one cell in which the user equipments are situated via two or more reconfigurable physical antennas configured according to an initial antenna parameter set.

According to a first aspect of the present invention this objective is achieved through a method which comprises the steps of: making one of the reconfigurable physical antennas of the at least one cell temporarily available for probing; preparing the available reconfigurable physical antenna for probing by reconfiguring one or more antenna parameters thereof in accordance with a probing antenna parameter set; transmitting a new probe cell from the prepared reconfigurable physical antenna; collecting measurement reports from the user equipments within the at least one cell and the probe cell; evaluating the probing antenna parameter set based on the collected measurement reports; determining if the reconfigurable physical antennas of the cell shall use the probing antenna parameter set or the initial antenna parameter set; removing the probing cell and adjusting the reconfigurable physical antennas of the cell in accordance with the determination.

A further objective of the present invention is to provide an improved arrangement for probing of alternative antenna configurations in a communication network system comprising a plurality of communication network nodes communicating with one or more user equipments, where each network node is serving at least one cell in which the user equipments are situated via two or more reconfigurable physical antennas configured according to an initial antenna parameter set.

According to a second aspect of the present invention this further objective is achieved through an arrangement which comprises: a switching arrangement for making one of the reconfigurable physical antennas of the at least one cell temporarily available for probing; a reconfiguration arrangement for preparing the available reconfigurable physical antenna for probing by reconfiguring one or more antenna parameters thereof in accordance with a probing antenna parameter set; a transmitter arranged to transmit a new probe cell from the prepared reconfigurable physical antenna; a receiver arranged to collect measurement reports from the user equipments within the at least one cell and the probe cell; a control unit arranged to evaluate the probing antenna parameter set based on the collected measurement reports; the control unit further being arranged to determine if the reconfigurable physical antennas of the cell shall use the probing antenna parameter set or the initial antenna parameter set; a switching and reconfiguration arrangement for removing the probing cell and adjusting the reconfigurable physical antennas of the cell in accordance with the determination.

A yet further objective of the present invention is to provide an improved communication network node for probing of alternative antenna configurations in a communication network system comprising a plurality of communication network nodes communicating with one or more user equipments, where each network node is serving at least one cell in which the user equipments are situated via two or more reconfigurable physical antennas configured according to an initial antenna parameter set.

According to a third aspect of the present invention this further objective is achieved through a communication network node which comprises: a switching arrangement for making one of the reconfigurable physical antennas of the at least one cell temporarily available for probing; a reconfiguration arrangement for preparing the available reconfigurable physical antenna for probing by reconfiguring one or more antenna parameters thereof in accordance with a probing antenna parameter set; a transmitter arranged to transmit a new probe cell from the prepared reconfigurable physical antenna; a receiver arranged to collect measurement reports from the user equipments within the at least one cell and the probe cell; a control unit arranged to evaluate the probing antenna parameter set based on the collected measurement reports; the control unit further being arranged to determine if the reconfigurable physical antennas of the cell shall use the probing antenna parameter set or the initial antenna parameter set; a switching and reconfiguration arrangement for removing the probing cell and adjusting the reconfigurable physical antennas of the cell in accordance with the determination.

A still further objective of the present invention is to provide an improved user equipment for enabling probing of alternative antenna configurations in a communication network system comprising a plurality of communication network nodes communicating with one or more user equipments, the user equipments being arranged to transmit measurement reports over a radio interface in a communication network system where each network node is serving at least one cell in which the user equipments are situated via two or more reconfigurable physical antennas configured according to an initial antenna parameter set.

According to a fourth aspect of the present invention this further objective is achieved through a user equipment where the information in the measurement reports is adapted to facilitate analysis by a control unit for evaluating an alternative probing antenna parameter set.

Further embodiments are listed in the dependent claims.

Thanks to the provision of a method, an arrangement, a communication network node and a user equipment which provides for probing of alternative antenna configurations in a communication network system several advantages are provided.

Using the teachings of the invention is provided for solutions to automating coverage and capacity optimization whilst taking into account the importance of low traffic impact while evaluating possible configurations.

As the network evolves, e.g. new sites are added, new subscriber behavior introduced etc., time-consuming drive tests and subsequent analysis would previously have had to be repeated. Using the teachings of the invention this is no longer required as it becomes possible to collect information from normal UEs in the network during normal operation thereof.

The teachings of the invention allows for the antenna parameters to change dynamically depending on the instantaneous traffic situation in the network.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2a shows the information transfer between the user equipment, radio base station and a radio network controller node in a first communication network architecture according to FIG. 1a;

DETAILED DESCRIPTION

Figure 1A:
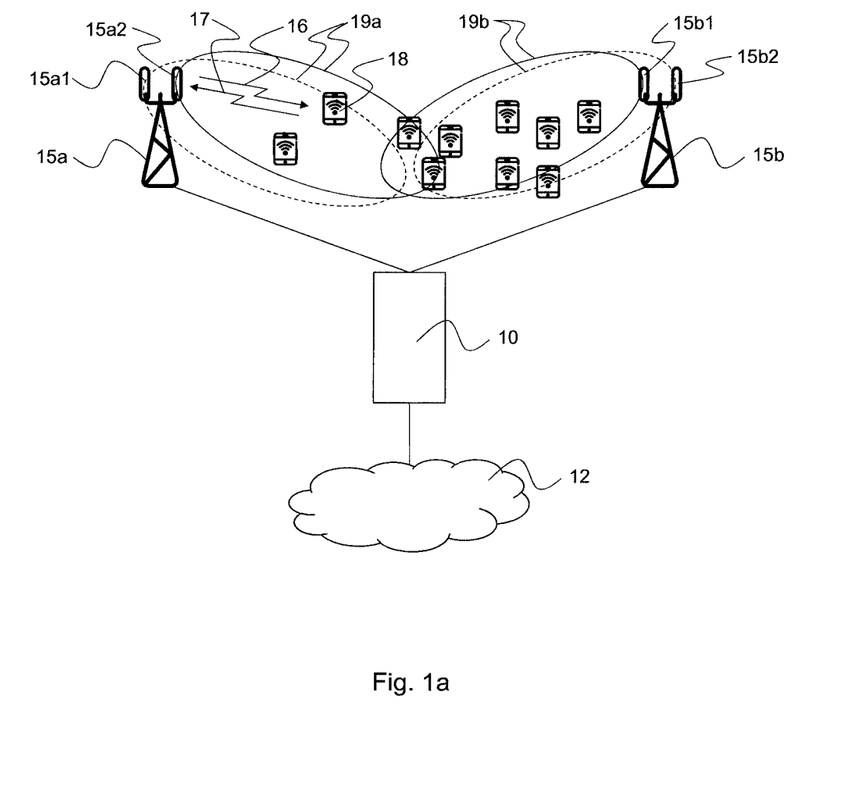
FIG. 1a is a schematic illustration of a first communication network architecture according to the present invention.

FIG. 1a depicts a communication system including a Radio Access Network (RAN), such as the Universal Terrestrial Radio Access Network (UTRAN) architecture, comprising at least one Radio Base Station (RBS) 15a, 15b also denoted as NodeB or NB (Node B) for short, (two are shown in FIG. 1) connected to a controller unit, such as a radio network controller node (RNC) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15a, 15b transmits data blocks to each UE 18. On the uplink channel 17, the UEs 18 transmit data blocks to the RBS 15a, 15b.

Figure 1B:
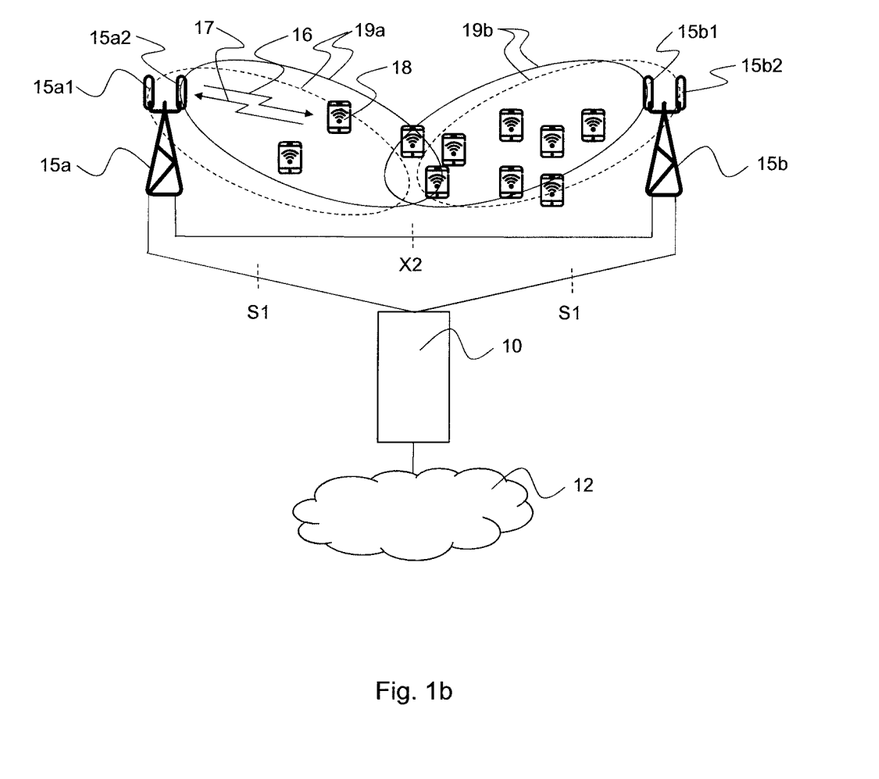
FIG. 1b is a schematic illustration of an alternative second communication network architecture according to the present invention.

FIG. 1b depicts an alternative communication system including a Radio Access Network (RAN), such as the Evolved Universal Terrestrial Radio Access Network (E-UTRAN) architecture. Compared to traditional GSM and UMTS networks, the E-UTRAN does not include a BSC (Base Station Controller) or RNC (Radio Network Controller) functional entity. Instead, many of the controlling functions have been moved towards the Radio Base Stations (RBS) 15a, 15b also denoted as eNodeB or eNB (Evolved Node B) for short, which interconnects directly with the Evolved Packet Core (EPC) 10 across an S1 Interface. The eNodeB 15a, 15b includes a Radio Resource Controller (RRC) function and therefore provides access and mobility control. The eNodeB's 15a, 15b are interconnected with each other by means of an X2 interface. It is assumed that there always exists an X2 interface between the eNodeB's 15a, 15b that need to communicate with each other, e.g. for support of handovers.

According to a preferred embodiment of the present invention, the communication system is herein described as an Evolved-UMTS communication system. The skilled person, however, realizes that the inventive method and arrangement works very well on other communications systems as well, such as other UMTS based communications systems.

The UEs 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

The present invention is based on the realization that reconfigurable antennas 15a1, 15a2, 15b1, 15b2 may be utilized in order to ensure that a new network is simple to deploy and cost efficient to operate. In particular the possibilities provided by reconfigurable antennas 15a1, 15a2, 15b1, 15b2 have been considered for providing an automatic antenna tuning system for enhancing coverage and capacity.

The present invention is further based on the believe that it will not be possible to implement automatic solutions where the UEs 18 may suffer radio coverage loss. It is believed that operators would be very hesitant to activate such a feature. The present invention is therefore based on the presumption that it must be possible to keep UEs 18 in coverage even during an evaluation phase. Thus in the following will be provided a possible solution to that problem.

Figure 2A:
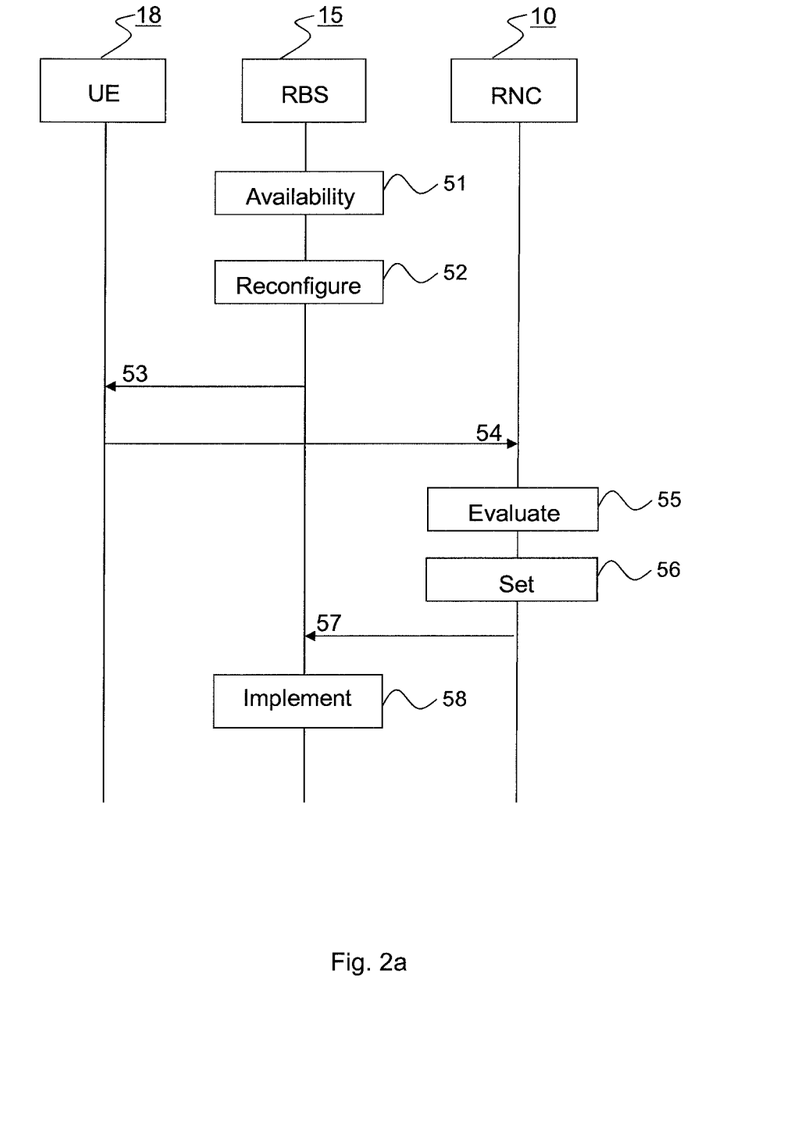

FIG. 2a shows the information transfer between a UE 18, radio base station 15 and a RNC 10 illustrating one embodiment of the method of probing of alternative antenna configurations in a UTRAN architecture communication network system in accordance with the present invention. The communication network system, as illustrated in FIGS. 1a and 1b, comprises a plurality of communication network nodes 15a, 15b communicating with one or more UEs 18, where each network node 15a, 15b is serving at least one cell 19a, 19b in which the UEs 18 are situated via two or more reconfigurable physical antennas 15a1, 15a2, 15b1, 15b2 configured according to an initial antenna parameter set.

As illustrated in FIG. 2a the method comprises the steps of: 51 making one 15a2, 15b2 of the reconfigurable physical antennas 15a1, 15a2, 15b1, 15b2 of the at least one cell 19a, 19b temporarily available for probing; 52 preparing the available reconfigurable physical antenna 15a2, 15b2 for probing by reconfiguring one or more antenna parameters thereof in accordance with a probing antenna parameter set; 53 transmitting a new probe cell 20a, 20b from the prepared reconfigurable physical antenna 15a2, 15b2; 54 collecting measurement reports from the UEs 18 within the at least one cell 19a, 19b and the probe cell 20a, 20b; 55 evaluating the probing antenna parameter set based on the collected measurement reports; 56, 57 determining if the reconfigurable physical antennas 15a1, 15a2, 15b1, 15b2 of the cell shall use the probing antenna parameter set or the initial antenna parameter set; 58 removing the probing cell 20a, 20b and adjusting the reconfigurable physical antennas 15a1, 15a2, 15b1, 15b2 of the cell 19a, 19b in accordance with the determination.

As illustrated in FIG. 2a the step 55 of evaluating the probing antenna parameter set based on the collected measurement reports and the step 56 of determining if the reconfigurable physical antennas 15a1, 15a2, 15b1, 15b2 of the cell shall use the probing antenna parameter set or the initial antenna parameter set will in the case of a UTRAN architecture communication network system be performed by the RNC 10.

Figure 2B:
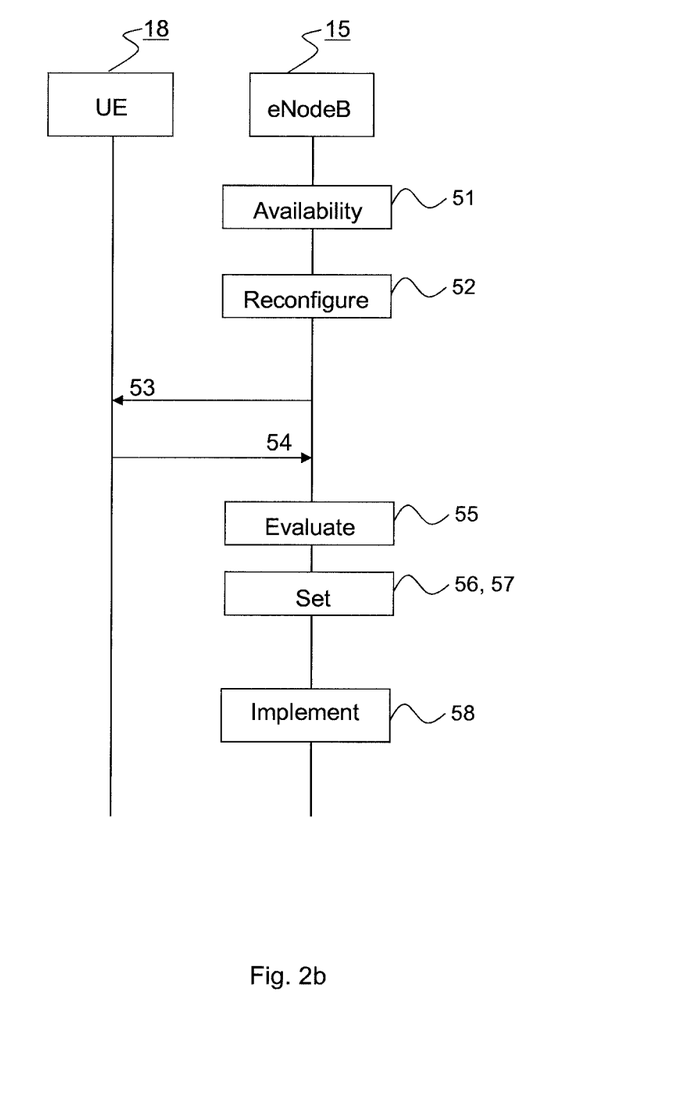
FIG. 2b shows the information transfer between the user equipment and eNodeB in a second communication network architecture according to FIG. 1b.

However, as illustrated in FIG. 2b the step 55 of evaluating the probing antenna parameter set based on the collected measurement reports and the step 56 of determining if the reconfigurable physical antennas 15a1, 15a2, 15b1, 15b2 of the cell shall use the probing antenna parameter set or the initial antenna parameter set will in the case of a E-UTRAN architecture communication network system be performed in the eNodeB 15.

In addition to being performed in the associated eNodeB 15, in an E-UTRAN architecture communication network system, these steps may also be performed in NodeBs i.e. in the radio access network or in a NMS/OSS, i.e. the operation support system. This implies that information may need to be sent in-between the entities. For example, handling probe cells 20a, 20b (e.g. stopping a physical antenna port, activating a probe cell) can be sent over the interface in-between eNodeBs and or OSS/NMS. Similarly information from observation, e.g. UE or network measurement, may be sent between the nodes.

In one embodiment the method further comprises the step of collecting measurement reports from measurements performed by the respective network node 15a, 15b.

In an alternative embodiment the step of preparing the available reconfigurable physical antenna 15a2, 15b2 for probing by reconfiguring one or more antenna parameters thereof in accordance with a probing antenna parameter set comprises reconfiguring at least one of: antenna tilt; antenna lobe direction; antenna lobe shape; antenna azimuth; and antenna elevation.

In yet an alternative embodiment the step of making one of the reconfigurable physical antennas 15a2, 15b2 of the at least one cell 19a, 19b temporarily available for probing comprises making the antenna and an associated power amplifier available for the probing cell 20a, 20b by means of virtual antenna port muting or re-direction.

In a further alternative embodiment the method further comprises the step of arranging the probing cell 20a, 20b to operate only on a sub band of the available frequency band.

In a still further alternative embodiment the method further comprises the step of adding a time shift to control signals of the probing cell 20a, 20b.

In an additional further alternative embodiment the method further comprises the step of avoiding handovers from other cells to the probing cell 20a, 20b.

In yet an additional further alternative embodiment the method further comprises the step of arranging the probing cell 20a, 20b to count access attempts without accepting any traffic.

In another alternative embodiment the method, once determined if the reconfigurable physical antennas 15a1, 15a2, 15b1, 15b2 of the cell shall use the probing antenna parameter set or the initial antenna parameter set, further comprises the step of configuring the probing cell 20a, 20b as a new cell and forcing handover of the UEs 18 in the old cell 19a, 19b to the new cell 20a, 20b, stopping the old cell 19a, 19b and adjusting the reconfigurable physical antennas 15a1, 15a2, 15b1, 15b2 of the old cell 19a, 19b in accordance with the determination and transferring the reconfigurable physical antennas 15a1, 15a2, 15b1, 15b2 of the old cell 19a, 19b to be used by the new cell 20a, 20b.

Figure 5:
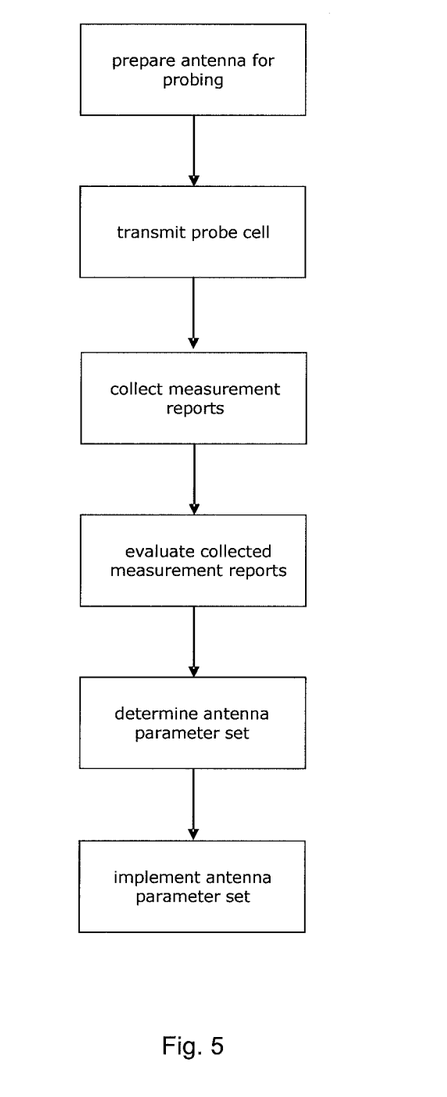
FIG. 5 is a flowchart illustrating the method in accordance with the present invention.

The different steps of the method in accordance with the present invention, as illustrated in FIG. 5, may be summarized as follows.

Initially, one of the reconfigurable physical antennas 15a2, 15b2 of the at least one cell 19a, 19b is made temporarily available for probing and prepared for probing by reconfiguring one or more antenna parameters thereof in accordance with a probing antenna parameter set.

Thereafter, a new probe cell 20a, 20b is transmitted from the prepared reconfigurable physical antenna 15a2, 15b2.

In a next step, measurement reports are collected from the UEs 18 within the at least one cell 19a, 19b and the probe cell 20a, 20b.

Thereafter, the probing antenna parameter set is evaluated based on the collected measurement reports.

Following evaluation, it is determined if the reconfigurable physical antennas 15a1, 15a2, 15b1, 15b2 of the cell shall use the probing antenna parameter set or the initial antenna parameter set.

Finally, the probing cell 20a, 20b is removed and the reconfigurable physical antennas 15a1, 15a2, 15b1, 15b2 of the cell 19a, 19b adjusted in accordance with the determination.

In FIGS. 1a and 1b is shown the same example of a normal mode operation where the load between two neighboring cells 19a, 19b is un-balanced. This load unbalance could be an indication that an alternative tuning of cell parameters should be tested.

Figure 3:
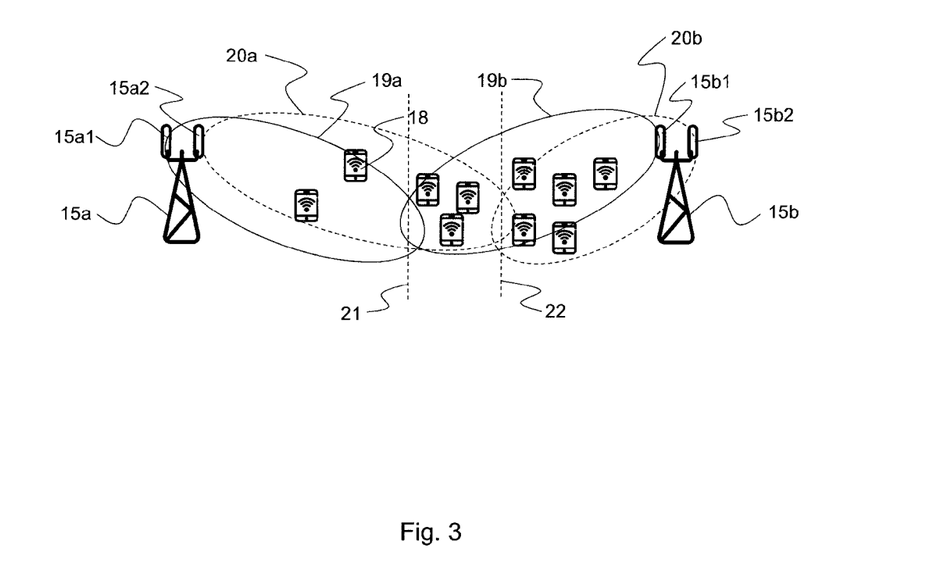
FIG. 3 is a simplified illustration of an example of cooperative probing in accordance with the present invention.

As shown in FIG. 3, the same two cells may be active in a cooperative probing. In case of load un-balance, as in FIGS. 1a and 1b, one simple solution candidate is to perform a down-tilt of the cell with high load 20b in and a corresponding up-tilt of the cell 20a with lower load. The effect of the antenna tilt change is that the cell border moves geographically. The cell border between the nominal cells 19a and 19b is denominated with 21 and the cell border between the probing cells 20a and 20 b, which as can be seen in FIG. 3 has moved to the right, is denominated 22. As illustrated in this example this also evens out the load difference between the two nominal cells.

Note that this type of cooperative probing might equally well involve two cells belonging to the same RBS 15. For example, the antenna width and antenna pointing directions of two adjacent cells can be adjusted in a similar manner. A cell with low load can probe with a wider sector beam and a cell with high load can probe with a narrower sector beam.

The probe cell 20a, 20b can now start transmitting and act as an ordinary cell. UEs 18 in the network and especially in the nominal cell 19a, 19b will see it as a new neighbor. The network will now start evaluating, one or possible several different combinations of antenna parameters e.g. tilt, azimuth and lobe shapes. The combinations can be either given from a planning tool, or an optimization algorithm. For every combination the network collect UE (downlink) and network measurement (uplink). This data and information may be stored in many different ways; per area, per cell, as number of served UEs 18, as events or as statistical samples.

If one shall accept handovers to the probe cell 20a, 20b or not is a matter of strategy. If the bandwidth is shared between probe cell 20a, 20b and nominal cell 19a, 19b or if the probe cell frequency band is limited it may be a good idea to limit handovers from other cells. Therefore it may be good to inform neighbors that handovers shall be restricted to probe cells 20a, 20b.

If one considers the case where the probe cell 20a, 20b has similar coverage as the nominal cell 19a, 19b, UEs 18 served by the nominal cell can report the probe cell 20a, 20b, using e.g., Reference Signal Received Power (RSRP) reports. The UE 18 covered by the neighboring cell cannot report the probe cell 20. Further we may have a UE 18 that is not covered at all.

If we then change the antenna parameters, e.g. tilt or lobe shape, we may have a UE 18 that no longer can report the probe cell 20a, 20b. Therefore in case the antenna parameters of the nominal cell 19a, 19b are altered, then this will most likely result in a coverage loss in some areas. If on the other hand, all UEs 18 still report the probe cell 20a, 20b then we can conclude that a similar change to the nominal cell 19a, 19b will not result in a coverage loss.

UEs 18 will sometimes report the probe cell 20a, 20b as a good or even better candidate than the serving cell 19a, 19b, but since the network decides finally on handovers UEs 18 are kept in the nominal cells 19a, 19b—but measurements are collected. Similar approach can be applied to UEs 18 that would suffer from being served by the new cell—they would not report on it. This principle applies on both intra and inter frequency as well as other Radio Access Technologies.

UEs 18 that earlier suffered from no service at all and that can decode the probe cell 20a, 20b will make a cell selection and the network can allow attachment (random access) and possible also a limited throughput, not to interfere with nominal cells 19a, 19b too much. At tracking area (routing area, location area) borders UEs 18 from nominal cells 19a, 19b, having different TAs, may do cell reselection. It can be hard to separate those UEs 18 from UEs 18 missing coverage completely. But by letting the probe cell 20a, 20b move back to the original configuration it would be possible to count the fraction of UEs 18 moving back to the nominal cells 19a, 19b.

Since the impact from this method can be considered small from a performance point of view, by e.g. allowing the probe cell 20a, 20b to operate over a small bandwidth, one can expect the period for evaluation to be measured in minutes, or hours—possible spanning over traffic distribution (high load/low load).

During the probing phase measurements from the UEs 18 are collected and the RBS 15 may also perform measurements e.g. on channel sounding signals from the UEs 18 or on random access transmissions.

Note that it may be so that a cell should have different configurations depending on traffic situation, so the solution may be more than just one configuration.

Once it has been decided to change the configuration, say the tilt angle for one or more cells, it may be good to change the nominal cell 19a, 19b first so that it has the optimal configuration found from the probing, then UEs 18 may be moved from the probe cell 20a, 20b and the probe cell 20a, 20b may be stopped. Finally unused antenna ports may be turned back to support the nominal cell 19a, 19b.

In another embodiment one can stop the probe cell 20a, 20b and start a new cell in the similar way as for a probe cell 20a, 20b. This time however, instead of a probe cell 20a, 20b we start the cell as it is meant to be after reconfiguration. The old nominal cell 19a, 19b then handover its users possible to the new cell, but perhaps also to other cells. This can sometimes be beneficial if the nominal cell 19a, 19b cannot move to the new configuration in small steps, which could cause a number of UEs 18 to suffer from drops.

It is outside of the scope of this invention to describe all possible methods that the collected measurement may be used. One very straightforward way to use the information would be to first assure that no UEs 18 loose coverage as a result of the alternative cell settings. Then one could e.g. compare the 10th percentiles of the RSRP measurements on the nominal cells 19a, 19b and the probing cells 20a, 20b and based on that decide if the probing parameters shall replace the nominal parameters or not.

Figure 4:
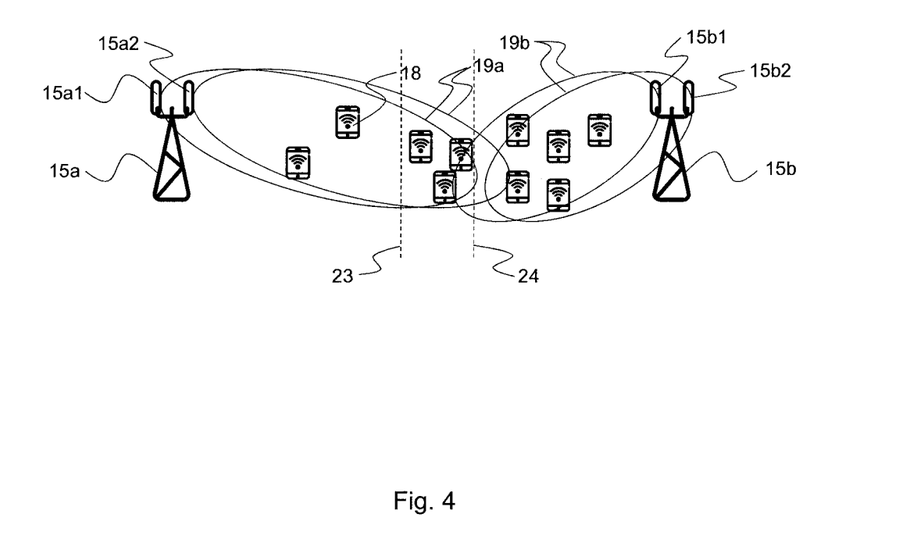
FIG. 4 is a simplified illustration of the resulting situation after optimization in accordance with the present invention.

In our example, as illustrated in FIGS. 1a, 1b, 2 and 4 the decision to use the probing parameter set is based on that the load balance between the two nominal cells 19a and 19b becomes more evenly distributed in case the probing parameter set is used. Consequently the parameters are changed accordingly and the resulting situation after optimization is shown in FIG. 4.

Figure 6:
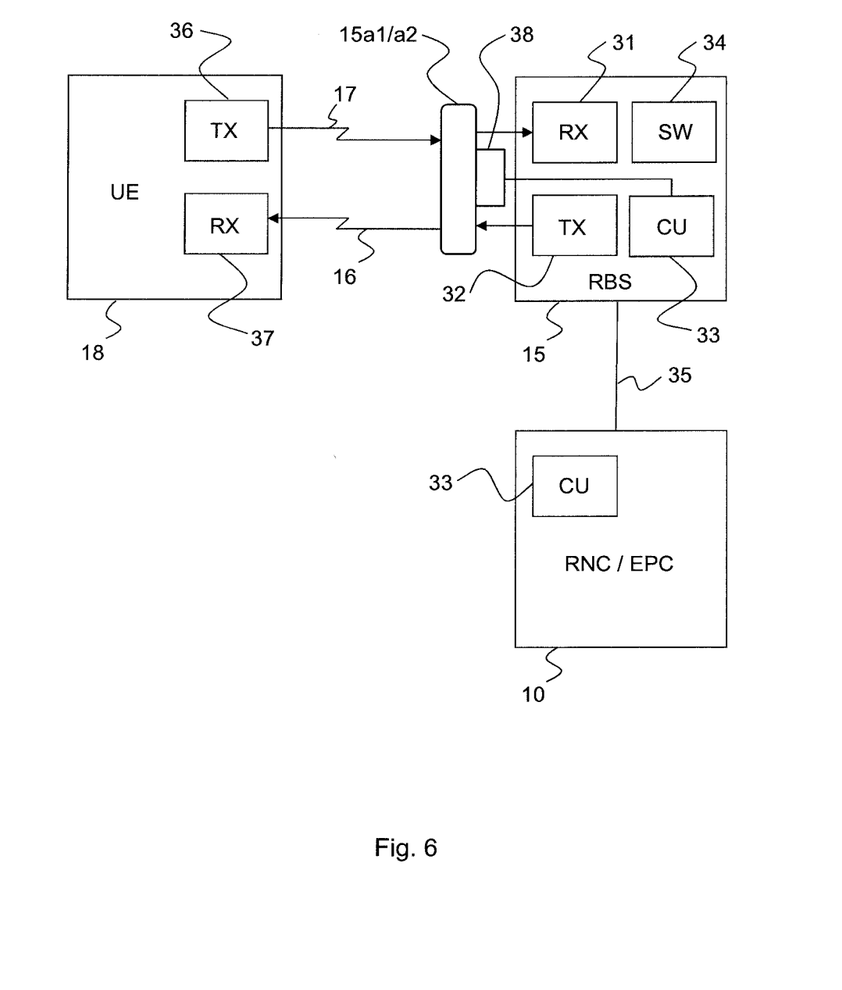
FIG. 6 is a simplified block diagram of a user equipment and an inventive communication network node as well as a radio network controller node.

The present invention further, as illustrated in FIG. 6, relates to an arrangement of probing of alternative antenna configurations in a communication network system comprising a plurality of communication network nodes 15a, 15b communicating with one or more UEs 18. Each network node 15a, 15b is serving at least one cell 19a, 19b in which the UEs 18 are situated.

The arrangement in accordance with the present invention comprises a receiver (RX) 31 arranged to collect measurement reports from the one or more UEs 18 within the at least one cell 19a, 19b and the probing cell 20a, 20b.

In the case of a RAN, such as the UTRAN architecture, an RNC 10 may be arranged to analyze collected measurement reports from at least some of the UEs 18 for determining if the reconfigurable physical antennas 15a1, 15a2 of the cell shall use the probing antenna parameter set or the initial antenna parameter set. A communication arrangement 35 may be arranged to communicate the antenna parameter set to be used from the RNC 10 to the network node 15 serving the at least one cell 19a for implementing the selected antenna parameter set in the reconfigurable physical antennas 15a1, 15a2, of the cell 19a.

In the case of a RAN, such as the E-UTRAN architecture, the network node 15 may be arranged to analyze collected measurement reports from at least some of the UEs 18 for determining if the reconfigurable physical antennas 15a1, 15a2, of the cell shall use the probing antenna parameter set or the initial antenna parameter set and also arranged to implement the selected antenna parameter set in the reconfigurable physical antennas 15a1, 15a2, of the cell 19a.

The UEs 18 are usually arranged to receive information transmitted over the downlink channel 16 by a radio interface transmitter (TX) 32. This information is received by the UEs 18 using a radio interface receiver (RX) 37.

The analysis functionality of the RNC 10 of a RAN, such as the UTRAN architecture, may, although described as performed exclusively by the RNC 10, be wholly or partially distributed between subordinate controlling units (CU) 33, which, as illustrated in FIG. 6, may be located within the RNC 10 or alternatively within the network node 15 or yet alternatively distributed between both the RNC 10 and the network node 15.

The analysis functionality of a RAN, such as the E-UTRAN architecture, may, although described as performed exclusively by the network node 15, be wholly or partially distributed between subordinate controlling units (CU) 33, which, as illustrated in FIG. 6, may be located within the network node 15 or alternatively within an Evolved Packet Core (EPC) 10 or yet alternatively distributed between both the network node 15 and the EPC 10.

Thus, in accordance with the present invention is suggested an arrangement for probing of alternative antenna configurations in a communication network system. The communication network system comprises a plurality of communication network nodes 15a, 15b communicating with one or more UEs 18. Each network node 15a, 15b is serving at least one cell 19a, 19b in which the UEs 18 are situated via two or more reconfigurable physical antennas 15a1, 15a2, 15b1, 15b2 configured according to an initial antenna parameter set.

A switching arrangement 34 is provided for making one of the reconfigurable physical antennas 15a1, 15a2, 15b1, 15b2 of the at least one cell 19a, 19b temporarily available for probing. The switching arrangement 34 may be arranged to perform virtual antenna port muting or optionally virtual antenna port re-direction for enabling transmission of a probing cell 20a, 20b during a probing mode. As an example, in preferred method of transmitting a probing cell in LTE, a cell is equipped with four physical antennas that are all active during normal mode operation. During the probing mode, one of the physical antenna elements and a corresponding power amplifier are made available for the probing cell 20a, 20b by means of virtual antenna port muting or re-direction. By muting it is meant that a reference signal associated with virtual antenna port is no longer transmitted. Alternatively, the reference signal associated with the virtual antenna port can be transmitted by another power amplifier and physical antenna. The probing cell can be configured with one single antenna port, or with 3 or even 4 antenna ports.

The arrangement further comprises a reconfiguration arrangement 38 for preparing the available reconfigurable physical antenna 15a2, 15b2 for probing by reconfiguring one or more antenna parameters thereof in accordance with a probing antenna parameter set. The reconfiguration arrangement 38 may be arranged to reconfigure at least one of: antenna tilt; antenna lobe direction; antenna lobe shape; antenna azimuth; and antenna elevation.

The arrangement also comprises a transmitter 32 arranged to transmit a new probe cell 20 from the prepared reconfigurable physical antenna 15a2, 15b2 as well as a receiver 31 arranged to collect measurement reports from the UEs 18 within the at least one cell 19a, 19b and the probe cell 20a, 20b.

Further, a control unit 33 is arranged to evaluate the probing antenna parameter set based on the collected measurement reports and to determine if the reconfigurable physical antennas 15a1, 15a2, 15b1, 15b2 of the cell shall use the probing antenna parameter set or the initial antenna parameter set.

Finally, a switching and reconfiguration arrangement 34, 38 is provided for removing the probing cell 20a, 20b and adjusting the reconfigurable physical antennas 15a1, 15a2, 15b1, 15b2 of the cell 19a, 19b in accordance with the determination.

In accordance with the present invention is further provided a communication network node 15a for probing of alternative antenna configurations in a communication network system comprising a plurality of communication network nodes 15a, 15b communicating with one or more UEs 18. Each network node 15a, 15b is serving at least one cell 19a, 19b in which the UEs 18 are situated via two or more reconfigurable physical antennas 15a1, 15a2, 15b1, 15b2, which are configured according to an initial antenna parameter set.

A switching arrangement 34 is provided in the communication network node 15a for making one of the reconfigurable physical antennas 15a2, 15b2 of the at least one cell 19 temporarily available for probing.

Further, a reconfiguration arrangement 38 is provided in the communication network node 15a for preparing the available reconfigurable physical antenna 15a2, 15b2 for probing by reconfiguring one or more antenna parameters thereof in accordance with a probing antenna parameter set.

Still further, a transmitter 32 is provided in the communication network node 15a and arranged to transmit a new probe cell 20a, 20b from the prepared reconfigurable physical antenna 15a2, 15b2.

Yet still further, a receiver 31 is provided in the communication network node 15a and arranged to collect measurement reports from the UEs 18 within the at least one cell 19a, 19b and the probe cell 20a, 20b.

A control unit 33 is further provided in the communication network node 15a and arranged to evaluate the probing antenna parameter set based on the collected measurement reports. The control unit 33 is further arranged to determine if the reconfigurable physical antennas 15a1, 15a2, 15b1, 15b2 of the cell shall use the probing antenna parameter set or the initial antenna parameter set.

Finally a switching and reconfiguration arrangement 34, 38 is provided in the communication network node 15a for removing the probing cell 20a, 20b and adjusting the reconfigurable physical antennas 15a1, 15a2, 15b1, 15b2 of the cell 19a, 19b in accordance with the determination.

In one embodiment the receiver 31 of the communication network node 15a further is arranged to collect measurement reports from measurements performed by the respective network node 15a, 15b.

In a further embodiment the reconfiguration arrangement 38 of the communication network node 15a is arranged to prepare the available reconfigurable physical antenna 15a2, 15b2 for probing by reconfiguring one or more antenna parameters thereof in accordance with a probing antenna parameter set which comprises reconfiguring at least one of: antenna tilt; antenna lobe direction; antenna lobe shape; antenna azimuth; and antenna elevation.

In a still further embodiment the switching arrangement 34 of the communication network node 15a is arranged to make one of the reconfigurable physical antennas 15a1, 15a2, 15b1, 15b2 of the at least one cell 19a, 19b temporarily available for probing through making the antenna and an associated power amplifier available for the probing cell 20a, 20b by means of virtual antenna port muting or re-direction.

In yet a further embodiment the transmitter 32 of the communication network node 15a is arranged to operate the probing cell 20a, 20b only on a sub band of the available frequency band.

In a yet still further embodiment the transmitter 32 of the communication network node 15a is arranged to add a time shift to control signals of the probing cell 20a, 20b.

In another further embodiment the receiver 31 of the communication network node 15a further is arranged to avoid handovers from other cells to the probing cell 20a, 20b.

In still another embodiment the receiver 31 of the communication network node 15a further is arranged to count access attempts to probing cell 20a, 20b without accepting any traffic.

In yet another embodiment, once the control unit 33 of the communication network node 15a has determined if the reconfigurable physical antennas 15a1, 15a2, 15b1, 15b2 of the cell shall use the probing antenna parameter set or the initial antenna parameter set, the switching and reconfiguration arrangement 34, 38 is arranged to configure the probing cell 20a, 20b as a new cell and force handover of UEs 18 in the old cell 19a, 19b to the new cell 20a, 20b, stop the old cell 19a, 19b and adjust the reconfigurable physical antennas 15a1, 15a2, 15b1, 15b2 of the old cell 19a, 19b in accordance with the determination and transfer the reconfigurable physical antennas 15a1, 15a2, 15b1, 15b2 of the old cell 19a, 19b to be used by the new cell 20a, 20b.

The present invention, as illustrated in FIG. 6, also relates to a UE 18 for enabling probing of alternative antenna configurations in a communication network system comprising a plurality of communication network nodes 15a, 15b communicating with one or more UEs 18, the UEs 18 being arranged to transmit measurement reports over a radio interface 36 in a communication network system where each network node 15a, 15b is serving at least one cell 19a, 19b in which the UEs 18 are situated via two or more reconfigurable physical antennas 15a1, 15a2, 15b1, 15b2 configured according to an initial antenna parameter set. The information in the measurement reports is adapted to facilitate analysis by the control unit 33 for evaluating an alternative probing antenna parameter set.

In one embodiment the UE 18 is arranged to collect measurement reports from other UEs and save logs for transmission of these collected measurement reports over the radio interface 36 when within coverage of at least one cell 19a, 19b, 20a, 20b.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:
1. A method for probing of alternative antenna configurations in a communication network system comprising a plurality of communication network nodes communicating with one or more user equipments, where each network node is serving at least one cell in which the user equipments are situated via two or more reconfigurable physical antennas configured according to an initial antenna parameter set, characterised in that the method comprises the steps of:
    making one of the reconfigurable physical antennas of the at least one cell temporarily available for probing;
    preparing the available reconfigurable physical antenna for probing by reconfiguring one or more antenna parameters thereof in accordance with a probing antenna parameter set;
    transmitting a new probe cell from the prepared reconfigurable physical antenna;
    collecting measurement reports from the user equipments within the at least one cell and the probe cell;
    evaluating the probing antenna parameter set based on the collected measurement reports;
    determining if the reconfigurable physical antennas of the cell shall use the probing antenna parameter set or the initial antenna parameter set;
    removing the probing cell and adjusting the reconfigurable physical antennas of the cell in accordance with the determination.

2. A method according to claim 1, characterised in that it further comprises the step of collecting measurement reports from measurements performed by the respective network node.

3. A method according to claim 1, characterised in that the step of preparing the available reconfigurable physical antenna for probing by reconfiguring one or more antenna parameters thereof in accordance with a probing antenna parameter set comprises reconfiguring at least one of: antenna tilt; antenna lobe direction; antenna lobe shape; antenna azimuth; and antenna elevation.

4. A method according to claim 1, characterised in that the step of making one of the reconfigurable physical antennas of the at least one cell temporarily available for probing comprises making the antenna and an associated power amplifier available for the probing cell by means of virtual antenna port muting or re-direction.

5. A method according to claim 1, characterised in that it further comprises the step of arranging the probing cell to operate only on a sub band of the available frequency band.

6. A method according to claim 1, characterised in that it further comprises the step of adding a time shift to control signals of the probing cell.

7. A method according to claim 1, characterised in that it further comprises the step of avoiding handovers from other cells to the probing cell.

8. A method according to claim 1, characterised in that it further comprises the step of arranging the probing cell to count access attempts without accepting any traffic.

9. A method according to claim 1, characterised in that it, once determined if the reconfigurable physical antennas of the cell shall use the probing antenna parameter set or the initial antenna parameter set, further comprises the step of configuring the probing cell as a new cell and forcing handover of the user equipments in the old cell to the new cell, stopping the old cell and adjusting the reconfigurable physical antennas of the old cell in accordance with the determination and transferring the reconfigurable physical antennas of the old cell to be used by the new cell.

10. An arrangement for probing of alternative antenna configurations in a communication network system comprising a plurality of communication network nodes communicating with one or more user equipments, where each network node is serving at least one cell in which the user equipments are situated via two or more reconfigurable physical antennas configured according to an initial antenna parameter set, characterised in that the arrangement comprises:
  a switching arrangement for making one of the reconfigurable physical antennas of the at least one cell temporarily available for probing;
  a reconfiguration arrangement for preparing the available reconfigurable physical antenna for probing by reconfiguring one or more antenna parameters thereof in accordance with a probing antenna parameter set;
  a transmitter arranged to transmit a new probe cell from the prepared reconfigurable physical antenna;
  a receiver arranged to collect measurement reports from the user equipments within the at least one cell and the probe cell;
  a control unit arranged to evaluate the probing antenna parameter set based on the collected measurement reports;
  the control unit further being arranged to determine if the reconfigurable physical antennas of the cell shall use the probing antenna parameter set or the initial antenna parameter set;
  a switching and reconfiguration arrangement for removing the probing cell and adjusting the reconfigurable physical antennas of the cell in accordance with the determination.

11. A communication network node for probing of alternative antenna configurations in a communication network system comprising a plurality of communication network nodes communicating with one or more user equipments where each network node is serving at least one cell in which the user equipments are situated via two or more reconfigurable physical antennas configured according to an initial antenna parameter set, characterised in that the communication network node comprises:
  a switching arrangement for making one of the reconfigurable physical antennas of the at least one cell temporarily available for probing;
  a reconfiguration arrangement for preparing the available reconfigurable physical antenna for probing by reconfiguring one or more antenna parameters thereof in accordance with a probing antenna parameter set;
  a transmitter arranged to transmit a new probe cell from the prepared reconfigurable physical antenna;
  a receiver arranged to collect measurement reports from the user equipments within the at least one cell and the probe cell;
  a control unit arranged to evaluate the probing antenna parameter set based on the collected measurement reports;
  the control unit further being arranged to determine if the reconfigurable physical antennas of the cell shall use the probing antenna parameter set or the initial antenna parameter set;
  a switching and reconfiguration arrangement for removing the probing cell and adjusting the reconfigurable physical antennas of the cell in accordance with the determination.

12. A communication network node according to claim 11, characterised in that the receiver further is arranged to collect measurement reports from measurements performed by the respective network node.

13. A communication network node according to claim 11, characterised in that the reconfiguration arrangement is arranged to prepare the available reconfigurable physical antenna for probing by reconfiguring one or more antenna parameters thereof in accordance with a probing antenna parameter set which comprises reconfiguring at least one of: antenna tilt; antenna lobe direction; antenna lobe shape; antenna azimuth; and antenna elevation.

14. A communication network node according to claim 11, characterised in that the switching arrangement is arranged to make one of the reconfigurable physical antennas of the at least one cell temporarily available for probing through making the antenna and an associated power amplifier available for the probing cell by means of virtual antenna port muting or re-direction.

15. A communication network node according to claim 11, characterised in that the transmitter further is arranged to operate the probing cell only on a sub band of the available frequency band.

16. A communication network node according to claim 11, characterised in that the transmitter further is arranged to add a time shift to control signals of the probing cell.

17. A communication network node according to claim 11, characterised in that the receiver further is arranged to avoid handovers from other cells to the probing cell.

18. A communication network node according to claim 11, characterised in that the receiver further is arranged to count access attempts to probing cell without accepting any traffic.

19. A communication network node according to claim 11, characterised in that it, once the control unit has determined if the reconfigurable physical antennas of the cell shall use the probing antenna parameter set or the initial antenna parameter set, the switching and reconfiguration arrangement is arranged to configure the probing cell as a new cell and force handover of the user equipments in the old cell to the new cell, stop the old cell and adjust the reconfigurable physical antennas of the old cell in accordance with the determination and transfer the reconfigurable physical antennas of the old cell to be used by the new cell.

20. A user equipment for enabling probing of alternative antenna configurations in a communication network system comprising a plurality of communication network nodes communicating with one or more user equipments, the user equipments being arranged to transmit measurement reports over a radio interface in a communication network system where each network node is serving at least one cell in which the user equipments are situated via two or more reconfigurable physical antennas configured according to an initial antenna parameter set, characterized in that, the information in the measurement reports is adapted to facilitate:
  analysis by a control unit for evaluating an alternative probing antenna parameter set.

21. A user equipment according to claim 20, characterised in that, the user equipment is arranged to collect measurement reports from user equipments and save logs for transmission of these collected measurement reports over the radio interface when within coverage of at least one cell.

\* \* \* \* \*